Oct. 2, 1923.
E. C. DAMROW
MANUFACTURE OF BRICK CHEESE
Filed Dec. 16, 1921
1,469,251
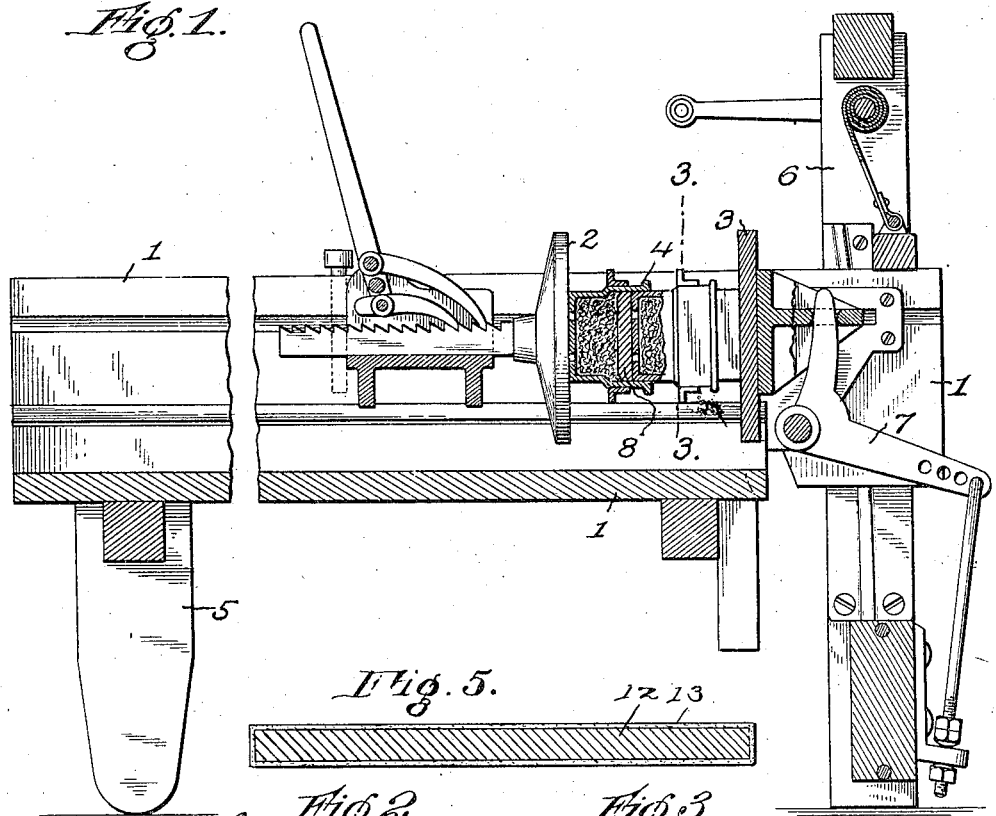
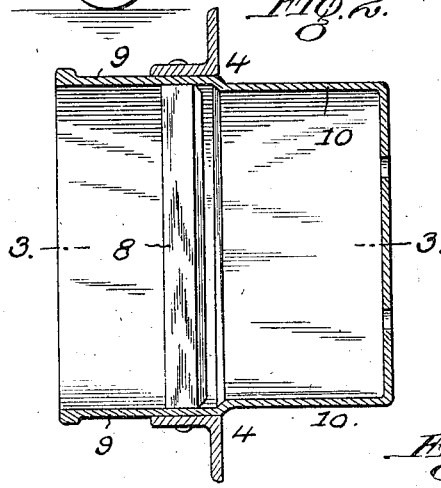
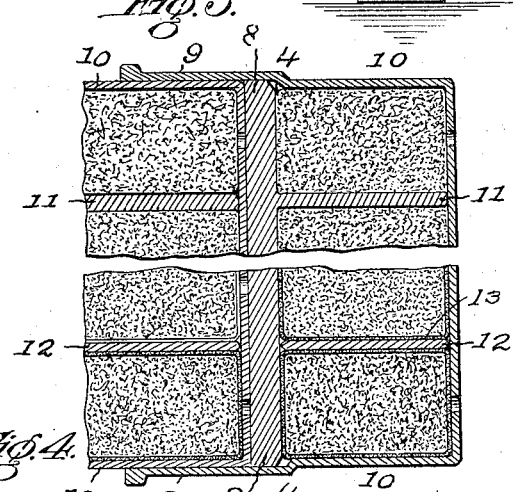
Witness:
T. J. Gathmann
Inventor:
Edward C. Damrow
By Robert Burns, Atty.

Patented Oct. 2, 1923.

1,469,251

UNITED STATES PATENT OFFICE.

EDWARD C. DAMROW, OF FOND DU LAC, WISCONSIN, ASSIGNOR TO DAMROW BROTHERS COMPANY, OF FOND DU LAC, WISCONSIN, A CORPORATION OF WISCONSIN.

MANUFACTURE OF BRICK CHEESE.

Application filed December 16, 1921. Serial No. 522,751.

*To all whom it may concern:*

Be it known that I, EDWARD C. DAMROW, a citizen of the United States of America, and a resident of Fond du Lac, in the county of Fond du Lac and State of Wisconsin, have invented a certain new and useful Improvement in the Manufacture of Brick Cheese, of which the following is a specification.

This invention relates to the manufacture of cheese in the form of rectangular pieces or blocks of a small size ready for packing, storage and shipment, and for convenient retailing without any subsequent cutting or sub-division, and has for its object:—

To provide a structural formation and association of parts or elements in the hoop or mold portion of a cheese press whereby a rapid and effective production of cheese in form of retail blocks or pieces is attained in a cheese press of the ordinary gravity pressure type in commercial quantities and in a simple and efficient manner, all as will hereinafter more fully appear.

In the accompanying drawing:—

Fig. 1, is a longitudinal sectional elevation illustrating the application of the present invention to a gang press of the gravity pressure type.

Fig. 2, is an enlarged longitudinal section of a cheese hoop or mold and its follower board.

Fig. 3, is an enlarged detail transverse section on line 3—3 Fig. 1, showing the relation of cheese hoop or mold parts in an intermediate step in the operation.

Fig. 4, is a companion view showing the relation of the parts in the final step of the operation.

Fig. 5, is an enlarged transverse section of a filler plate provided with a fabric facing.

Like reference numerals indicate like parts in the several views.

Referring to Fig. 1, of the drawing, 1 designates the elongated horizontal press bed of the press of the usual trough shape, adapted to support and guide the adjustable abutment platen 2, pressure platen 3 and the intermediate gang of cheese hoops or molds 4 of the press. The press bed 4 is supported at one end by fixed legs 5 upon which it has a pivotal or rocking movement by gravity, while its movable end is guided by an upright frame 6 and carries one or more pressure levers 7 of an angular form and which constitute an operative connection between the guide frame 6 and the pressure platen 3 to convert the downward movement of the press bed into a reduced and more powerful forward movement of said pressure platen, as set forth in detail in my companion application for Letters Patent, No. 522,752, filed Dec. 16, 1921.

In the present construction the cheese forming cavities of the series of cheese hoops or molds 4 are of a rectangular shape and of a size sufficient to contain the usual follower boards or plates 8 and the proper quantities of cheese forming curd to form elongated compressed slabs of cheese, adapted to be subdivided in the manner and by means hereinafter described into a plurality of smaller portions or blocks adapted for convenient disposal by the retail trade. In the construction shown in the drawing, the top or open ended portion 9 of each hoop or mold 4 is somewhat larger in size than the other close bottom portion 10 in order that the counterpart close bottom of the next adjacent cheese hoop or mold may fit and slide within the aforesaid top or open ended portion 9 and have pressure engagement against the follower plate or board 8 in the last mentioned portion in manner similar to the circular type of gang cheese hoops now in general use in the cheese making trade. And in like manner the walls of the hoops or molds 4 will be formed with the usual perforations and passages for the escape of the liquid, etc., from the cheese material during the operation of compressing the same.

11 designates a plurality of dividing plates or cutters associated in spaced relation on a follower board or plate 8, and detachably or fixedly secured to the forward or pressure face of said board or plate as may be found most desirable. Where a fixed attachment of the plates or cutters 11 is employed supplementary follower boards or plates will be used to carry the same, so as to be substituted for the plain form of follower plates in the intermediate step of severing or subdividing the cheese material hereinafter described in the mode of operation of the invention.

12 designate a plurality of filler plates adapted to fit between series of individual portions or blocks of cheese material which in the present invention are formed in each mold cavity, and it is within the scope of the present invention to provide the plates 12 with an exterior facing 13 of cheese cloth or like fabric, or to leave the same uncovered for operation in connection with the usual side wrappings of cheese cloth which is used on the individual portions or blocks aforesaid.

In the practical operation of the present improvement a cheese hoop containing the plain form of follower board 8 and the proper quantity of loose cheese or curd, usually one-fifth greater in bulk than that desired in the finished product, are exposed to pressure to compress said material into a slab of a thickness somewhat greater than that required in the finished product, say for instance one-eight to one-quarter of an inch thicker, this constituting the initial step or operation.

The next or succeeding step or operation consists in removing the plain follower plate or board 8 above described, from the cheese hoop or mold and the introduction instead of a follower board or plate carrying the plurality of spaced dividing plates or cutters 11. Pressure is then applied to the parts to cause said plates or cutters 11 to enter the partly compressed slab of cheese in the cheese hoop or mold to subdivide said slab into a plurality of small portions or blocks, as illustrated in Fig. 3.

The next or succeeding step consists in removing the follower plates carrying the cutters 11 above described from the cheese hoop or mold, after which the small portions or blocks formed in the last mentioned step or operation are removed, wrapped with cheese cloth and replaced in the cheese hoop or mold with the filler plates 12 inserted between the wrapped portions or blocks. In some cases the removal and wrapping of the portions or blocks may be dispensed with, and dependence for effective results placed upon a series of filler plates 12, covered with cheese cloth or like fabric as illustrated in Fig. 5. In either instance the plane follower plate or board 8 is replaced in the cheese hoop or mold and pressure applied to the parts to attain a final compression of the small portions or blocks aforesaid, to the required size. Such pressure is usually maintained for an extended period of time by the continuous pressure mechanism heretofore described with a view to insure the complete and effective removal of the moisture etc., contained in said portions or blocks, and prevent any swelling of the same after their removal from the cheese hoop or mold.

Having this fully described my invention what I claim as new and desire to secure by Letters Patent, is:—

1. In a device for making brick cheese, a cheese mold, a plurality of filler plates formed to fit the cavity of the mold and arranged in spaced relation so as to divide said cavity into a plurality of sub-cavities of a brick form, and facings of porous fabric connected to the respective faces of said filler plates to afford outlets for the fluid portion of the material in the pressing operation.

2. In a device for making brick cheese, a cheese mold, a plurality of filler plates formed to fit the cavity of the mold and arranged in spaced relation so as to divide said cavity into a plurality of sub-cavities of a brick form, and facings of porous fabric wrapped around said filler plates to afford outlets for the fluid portion of the material in the pressing operation.

Signed at Fond du Lac, Wis., this 8th day of Dec., 1921.

EDWARD C. DAMROW.